(12) United States Patent
Aslot et al.

(10) Patent No.: US 9,141,358 B2
(45) Date of Patent: Sep. 22, 2015

(54) REDUCING APPLICATION STARTUP TIME BY OPTIMIZING SPATIAL LOCALITY OF INSTRUCTIONS IN EXECUTABLES

(71) Applicant: International Business Machines Corporation, Armonk, NY (US)

(72) Inventors: Vishal Chittranjan Aslot, Austin, TX (US); Aravinda Prasad, Mysore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/337,689

(22) Filed: Jul. 22, 2014

(65) Prior Publication Data

US 2014/0366009 A1  Dec. 11, 2014

Related U.S. Application Data

(63) Continuation of application No. 13/365,317, filed on Feb. 3, 2012, now Pat. No. 8,789,033.

(51) Int. Cl.
*G06F 9/44* (2006.01)
*G06F 9/45* (2006.01)

(52) U.S. Cl.
CPC ............ *G06F 8/4441* (2013.01); *G06F 8/427* (2013.01); *G06F 8/443* (2013.01)

(58) Field of Classification Search
CPC ............................... G06F 8/443; G06F 8/4441
See application file for complete search history.

(56) References Cited

U.S. PATENT DOCUMENTS

| | | | |
|---|---|---|---|
| 5,655,122 A * | 8/1997 | Wu .............................. | 717/152 |
| 6,631,518 B1 | 10/2003 | Bortnikov et al. | |
| 7,076,773 B2 | 7/2006 | Schmidt | |
| 7,080,366 B2 | 7/2006 | Kramskoy et al. | |
| 2003/0226133 A1 * | 12/2003 | Grover ........................... | 717/140 |
| 2008/0115120 A1 | 5/2008 | Clifton et al. | |
| 2008/0282035 A1 * | 11/2008 | Hundt et al. ................... | 711/128 |
| 2010/0036981 A1 | 2/2010 | Ganesh et al. | |
| 2010/0088673 A1 * | 4/2010 | Chen et al. ..................... | 717/110 |
| 2010/0211924 A1 * | 8/2010 | Begel et al. .................... | 717/101 |
| 2012/0204152 A1 * | 8/2012 | Advani .......................... | 717/122 |

OTHER PUBLICATIONS

Sequeira et al., "Improving Spatial Locality of Programs via Data Mining;" Procedures of the 9th ACM SIGKDD International Conference on Knowledge Discovery and Data Mining, Aug. 2003.
Batchu et al., "Exploiting Procedure Level Locality to Reduce Instruction Cache Misses;" Interaction Between Compilers and Computer Architectures; Interact-8-2004; 8th Workshop, 2004.
Batchu et al., "A Study of Program Behavior to Establish Temporal Locality at the Function Level;" Technical Report, Rutgers University, DCS TR-475 2011.
USPTO, Office Action in U.S. Appl. No. 13/365,317, Sep. 9, 2013.
ASLOT, "Amendment and Response to Office Action," Jan. 9, 2014.

* cited by examiner

*Primary Examiner* — Philip Wang
(74) *Attorney, Agent, or Firm* — Thomas Tyson; Gregory K. Goshorn; Greg Goshorn, P.C.

(57) ABSTRACT

Provided are techniques for parsing source code file into a plurality of functions; generating a ranking corresponding to each of the plurality of functions based upon an order of occurrence in the source code file; generating a weight score corresponding to each of the plurality of functions based upon a weighing factor and the occurrence of a condition corresponding to each of the plurality of functions; and generating an object code file such that the plurality of functions are ordered in the object code file based upon the corresponding rankings and weight scores such during a startup of execution of the object code file a startup time is minimized with respect to an object code file not generated in accordance with the claimed method.

15 Claims, 10 Drawing Sheets

SAMPLE CODE (FILE.C)
170

```
1    MAIN ()
2    {
3            FUN_1 ();
4            FUN_2 ();
5            LFUN_1 ();
6
7            IF (<CONDITION>)
8                    FUN_3 ();
9            ELSE
10                   FUN_4 ();
11
12           DO {
13                   FUN_5 ();
14           } WHILE (<CONDITION>)
15
16           LFUN_2 ();
17   }
18
19   FUN_1 ()
20   {
21           RETURN;
22   }
23
24   FUN_2 ()
25   {
26           LFUN_3 ();
27           FUN_6 ();
28   }
29
30   FUN_3 ()
31   {
32           RETURN;
33   }
34
35   FUN_4 ()
36   {
37           IF (<CONDITION>)
38                   LFUN_4 ();
39   }
40
41   FUN_5 ()
42   {
43           RETURN;
44   }
45
46   FUN_6 ()
47   {
48           LFUN_5 ();
49   }
```

Figure 4

LIBRARY CODE (LFUN.C)
180

```
1   LFUN_1 ()
2   {
3       RETURN;
4   }
5
6   LFUN_2 ()
7   {
8       RETURN;
9   }
10
11  LFUN_3
12  {
13      LFUN_5 ();
14      RETURN;
15  }
16
17  LFUN_4 ();
18  {
19      RETURN;
20  }
21
22  LFUN_5 ()
23  {
24      RETURN;
25  }
```

REDUCING APPLICATION STARTUP TIME BY OPTIMIZING SPATIAL LOCALITY OF INSTRUCTIONS IN EXECUTABLES

CROSS-REFERENCES TO RELATED APPLICATIONS

The present application is a continuation and claims the benefit of the filing date of an application entitled, "Reducing Application Startup Time by Optimizing Spatial Locality of Instructions in Executables" Ser. No. 13/365,317, filed Feb. 3, 2012, now U.S. Pat. No. 8,789,033, issued Jul. 22, 2014, assigned to the assignee of the present application, and herein incorporated by reference

FIELD OF DISCLOSURE

The claimed subject matter relates generally to computer programming and, more specifically, to techniques for reducing the startup time of computer applications.

SUMMARY

Provided are techniques for reducing the startup time of computer applications. As computers and the associated memory have grown with respect to processing power and size, respectively, the applications that execute on computers have also grown in complexity and size. For example, the size of memory, or "footprint," necessary for Eclipse SDK, published by the Eclipse Foundation, is approximately 305 Megabytes (MB); Adobe Photo Shop and Adobe Flash Professional CS5, both published by the Adobe Systems, Inc. of San Jose, Calif., have footprints of 1 Gigabyte (GB) and 860 MB, respectively; Lotus Sametime Connect v8, published by International Business Machines, Inc. of Armonk, N.Y., has a footprint of 421 MB. Large files such as those included in the examples above typically include several executable/object files, which are ordered based upon functionality and order of appearance in a source code file.

Applications are typically stored and loaded onto a computing system in blocks, or "pages" of memory, with a typical page size of four Kilobytes (4 KB). Therefore, large programs must have many pages loaded before the program is able to perform a startup, which may include performing setup, initializing data and environmental variables and so on. Typically, an operating system (OS) may not load all the pages of a program at one time but rather loads pages as they are referenced, which may trigger page faults.

Provided are techniques for parsing a source code the into a plurality of functions and a plurality of library functions; generating a ranking corresponding to each of the plurality of functions and the plurality of library functions based upon an order of occurrence in the source code file; generating a weight score corresponding to each of the plurality of functions and the plurality of library functions based upon a weighing factor and the occurrence of a condition corresponding to each of the plurality of functions and the plurality of library functions; and generating an object code file such that the plurality of functions and the plurality of library functions are ordered in the object code file based upon the corresponding rankings and weight scores. In this manner, during a startup of execution of the object code file, startup time is minimized with respect to an object code file not generated in accordance with the claimed method.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented, programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks Many operating systems (OSs) load large programs a page at a time, loading each page upon the occurrence of a corresponding page fault, or an attempt to reference a page that is not in memory. In other words, many programs are not fully loaded into memory when the program starts to execute but rather loads a particular page only when the page is referenced during program execution. One aspect of program execution that is impacted by such page faults is program startup because a program is typically put to sleep every time a page fault occurs until the corresponding page is addressable.

The claimed subject matter minimizes the number of page faults at startup by optimizing the spatial locality of instructions in a program executable. Although there are currently several different techniques for the optimizing the locality of instructions in executables, all these techniques, both static and dynamic, are designed to optimize the running time of the corresponding programs.

Figure 1:
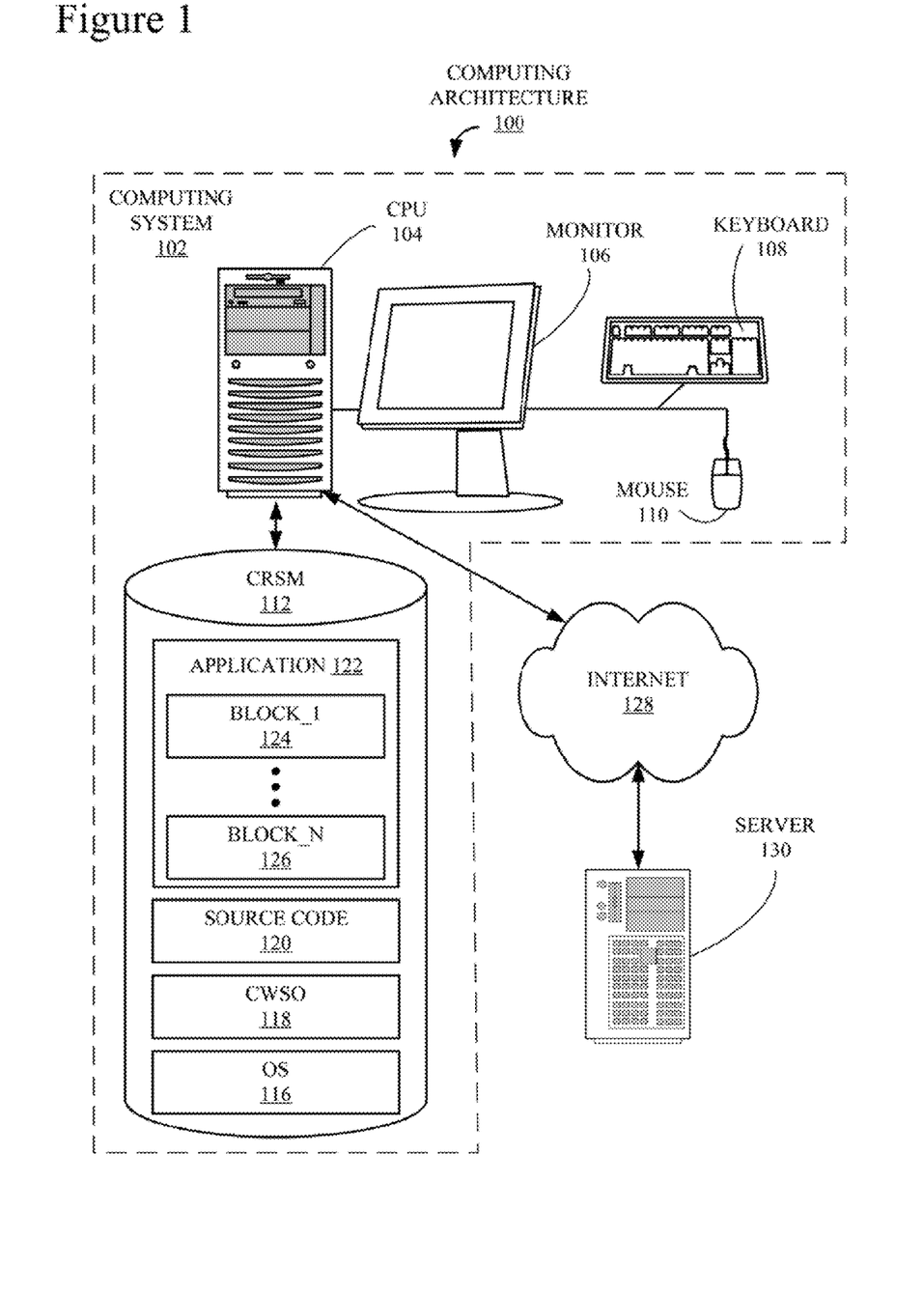
FIG. 1 is a block diagram of a computing architecture that may support the claimed subject matter.

Turning now to the figures, FIG. 1 is a block diagram of a computing architecture 100 that may support the claimed subject matter. A computing system 102 includes a central processing unit (CPU) 104, coupled to a monitor 106, a keyboard 108 and a pointing device, or "mouse," 110, which together facilitate human interaction with computing system 100 and computing system 102. Also included in computing system 102 and attached to CPU 104 is a computer-readable storage medium (CRSM) 112, which may either be incorporated into computing system 102 i.e. an internal device, or attached externally to CPU 104 by means of various, commonly available connection devices such as but not limited to, a universal serial bus (USB) port (not shown).

CRSM 112 is illustrated storing an operating system (OS) 116, a compiler with startup optimization (CWSO) 118, a source code 120 and an application compiled in accordance with the disclosed technology, i.e. application 122. In this example, source code 120 includes both source code (see 170, FIG. 3) and library functions (see 180, FIG. 4). Application 122 is shown divided into blocks, i.e. a block_1 124 through a block_N 126. Those with skill in the relevant arts will recognize OS 116 and the significance of the division of application 122 into blocks 124-126, which facilitates the loading of application 122 onto computing system 102 for execution of by one or more processors (not shown) of CPU 104. Components 118, 120, 122, 122, 124 and 126 are described in more detail below in conjunction with FIGS. 2-11.

Computing system 102 and CPU 104 are connected to the Internet 128, which is also connected to a server computer 130. Although in this example, computing system 102 and server 128 are communicatively coupled via the Internet 128, they could also be coupled through any number of communication mediums such as, but not limited to, a local area network (LAN) (not shown). Further, it should be noted there are many possible computing system configurations, of which computing architecture 100 is only one simple example. For example, any or both of CWSO 118 and source code 120 may be stored on CRSM (not shown) of server 130. In that case, CWSO 118 may implement the claimed subject matter on server 130 and download application 122 to computing system 102 or another system via the Internet 128 for execution on computing system 102 or the other system, respectively.

Figure 2:
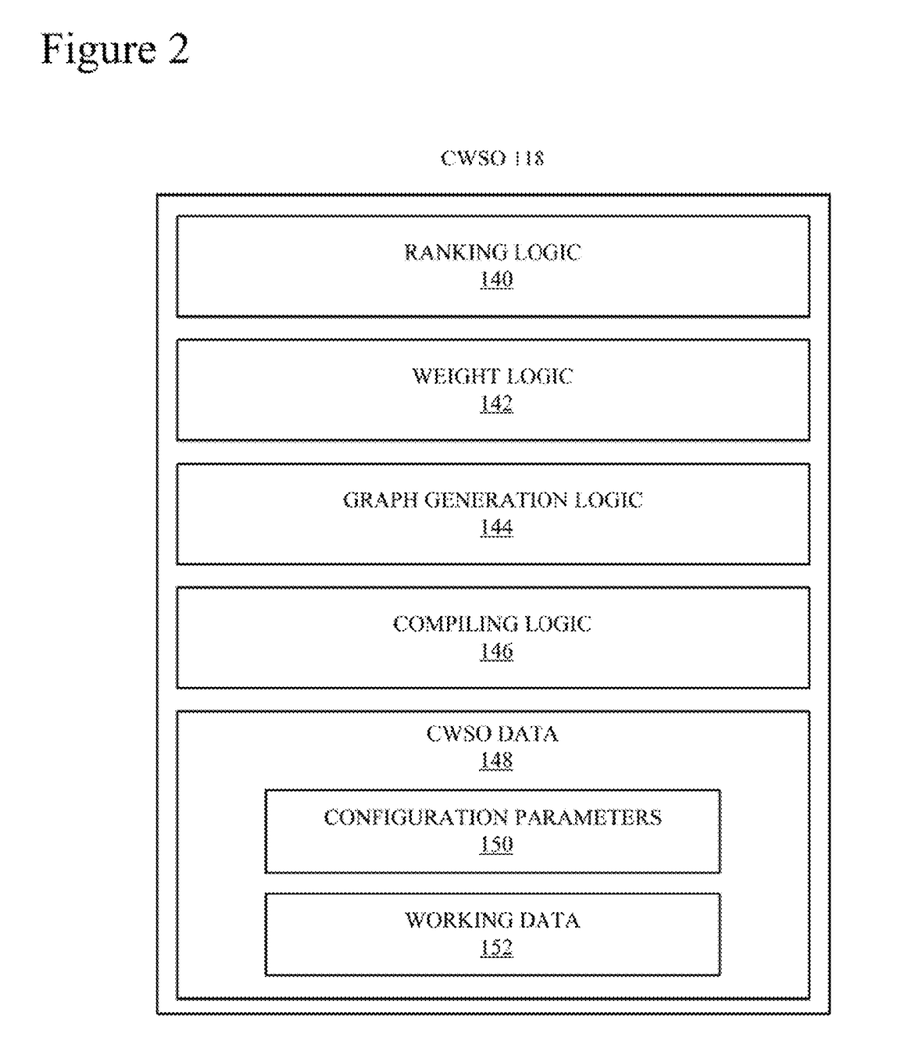
FIG. 2 is a block diagram of a Compiler With Startup Optimization (CWSO) that may implement the claimed subject matter.

FIG. 2 is a block diagram of CWSO 118 of FIG. 1 in greater detail. In this example, logic associated with CWSO 118 is stored on CRSM 112 (FIG. 1) and executed on one or more processors (not shown) of CPU 104 (FIG. 1). As explained above in conjunction with FIG. 1, in an alternative embodiment, logic associated with CWSO 118 could be stored and executed on server 130 (FIG. 1). In addition, it should be noted that the representation of CWSO 118 in FIG. 2 is a logical model. In other words, components 140, 142, 144, 146 and 148, introduced below, may be stored in the same or separates files and loaded and/or executed within architecture 100 and computing system 102 either as a single system or as separate processes interacting via any available inter process communication (IPC) techniques.

CWSO 118 includes ranking logic 140, weight logic 142, graph generation logic 144, compiling logic 146 and CWSO data 148. Ranking logic 140 associates a relative ranking to each function and library function associated with a source code file (see 170, FIG. 3 and 180, FIG. 4; see 240, FIG. 6). Weight logic 142 associates a relative weight to each function and library function associated with a source code file (see 240, FIG. 6). Using the relative rankings generated in conjunction with ranking logic 140 and the relative weights generated in conjunction with weight logic 142, graph generation logic 144 generates a weight and ranking (WR) graph (see 300, FIG. 8). Compiling logic 146, using the WR graph generated by graph generation logic 144, generates a compiled application, such as application 122 (FIG. 1), complied in accordance with the disclosed technology.

CWSO data 148 includes configuration parameters 150 and working data 152. Configuration parameters 150 include information on various user or administrator preferences that have been set to control the operation of CWSO 118. Such parameters may include, but are not limited to, settings to control the rankings and weights generated by ranking logic 140 and weight logic 142, respectively. Working data 152 stores the results of intermediate operations such as, but not limited to, the rankings, weights and identity of corresponding functions during the generation of a WR graph.

Figure 3:
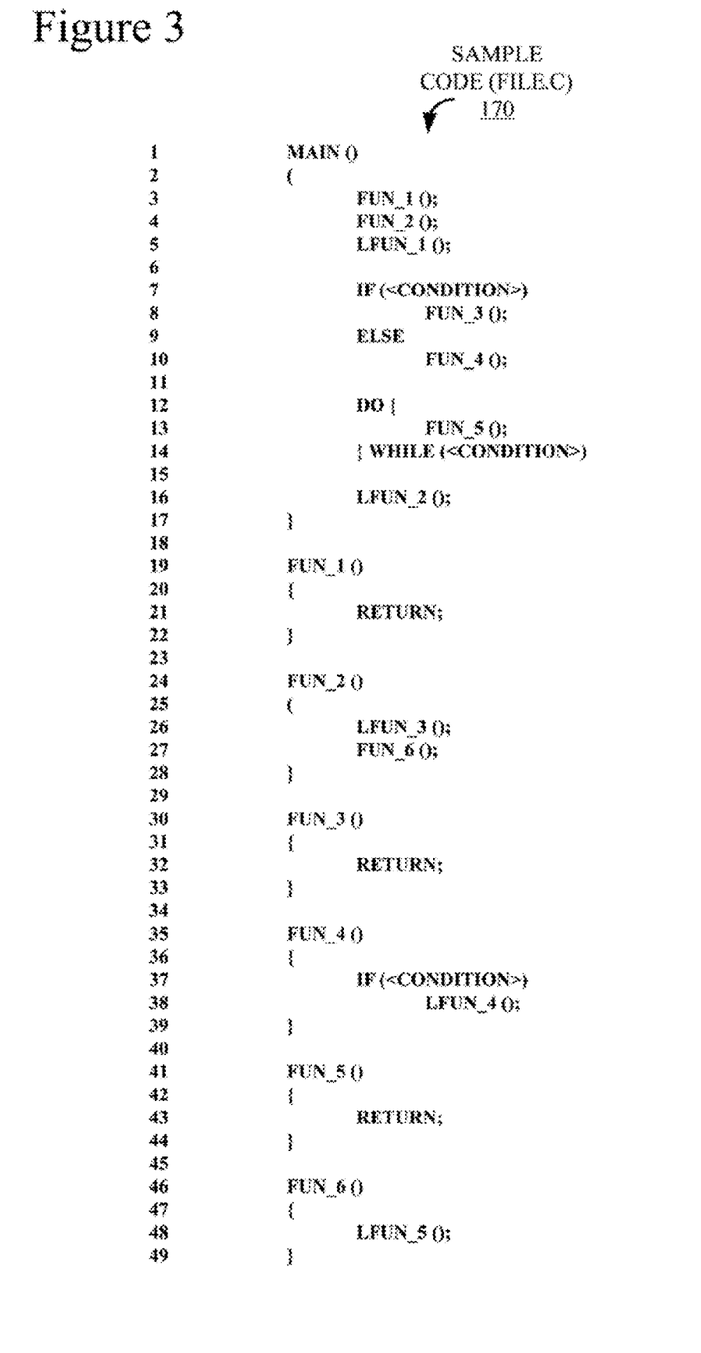
FIG. 3 is a listing of as source code file, i.e. file.c, that is used as an example throughout the remainder of the Specification.

FIG. 3 is a listing of a source code, i.e. a the entitled "file.c," 170, that is used as an example throughout the remainder of the Specification. Source code 170 should be familiar to those with skill in the relevant arts. Source code 170 does not actually provide any functionality but rather is use merely for illustrative purposes. Each line of source code 170 is associated with a number 1-49 so that individual lines may be references during the following description.

Source code 170 is composed of a main function, i.e. "main;" (170, lines 1-17) that includes calls to both functions (see 170, lines 3, 4, 8, 10 and 13) and library functions (see 170, lines 5 and 16). Functions are defined following main, specifically a "fun_1" (170, lines 19-22), a "fun_2" (170, lines 24-28), a "fun_3" (170, lines 30-33), a "fun_4" (170, lines 35-39) a "fun_5" (170, lines 41-44) and a "fun_6" (170, lines 46-49). Referenced library functions (see 170, lines 5, 16, 26, 38 and 48) are described below in conjunction with FIG. 4. There are also examples of statements that include some condition for execution (see 170, lines 7, 14 and 37). It should be noted that each condition does not need to be the same as the other conditions.

Figure 4:
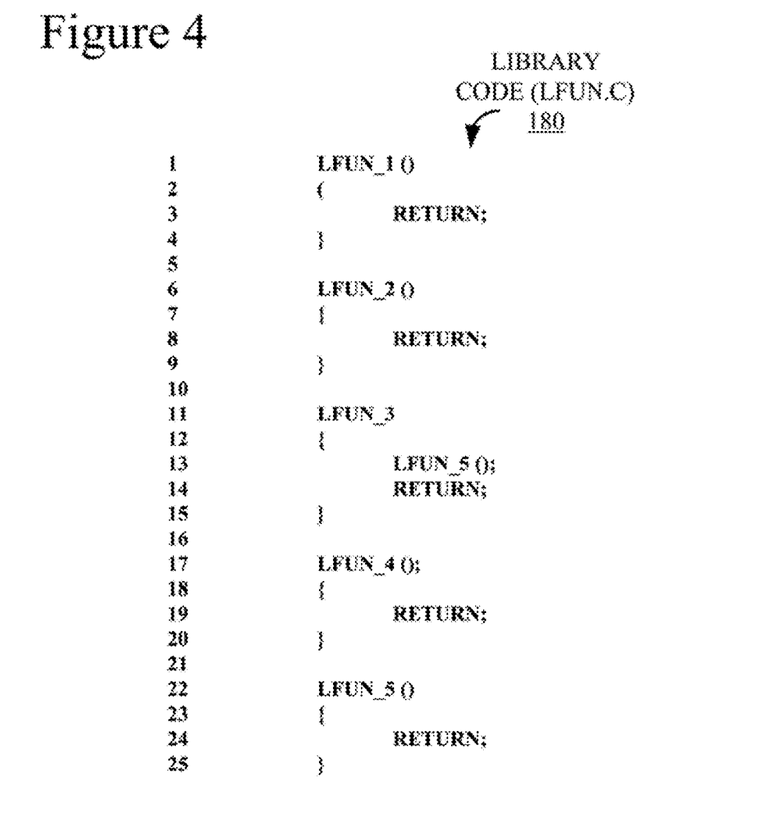
FIG. 4 is a listing of a library code file, i.e. lfun.c, used as an example throughout the remainder of the Specification.

FIG. 4 is a listing of a library code, i.e. a file entitled "lfun.c," 180 used as an example throughout the remainder of the Specification. Like source code 170, library code 180 does not actually provide any actual functionality but rather is use merely for illustrative purposes. Further, each line is associated with a number 1-25 so that individual lines may be references during the following description. Library code 180 includes several library functions, or "lfuns," i.e. a "lfun_1" (180, lines 1-4), a "lfun_2" (180, lines 6-9), a "lfun_3" (180, lines 11-15), a "lfun_4" (180, lines 17-20) and a "lfun_5" (180, lines 22-25).

Figure 5:
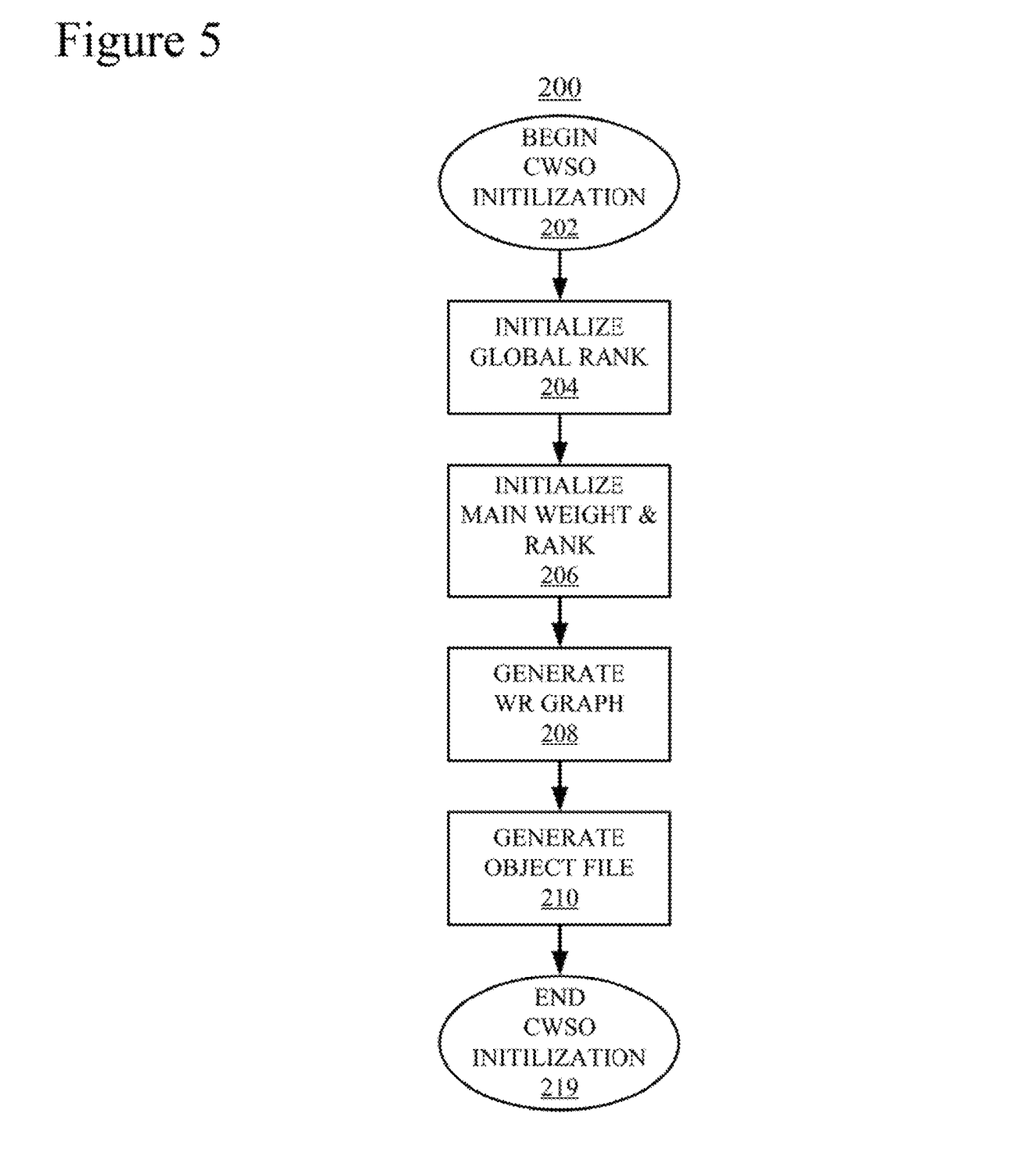
FIG. 5 is a flowchart of a "CWSO Initialization" process that may implement aspects of the claimed subject matter.

FIG. 5 is a flowchart of a "CWSO initialization" process 200 that may implement aspects of the claimed subject matter. In this example, logic associated with process 200 is stored in conjunction with CWSO 118 (FIGS. 1 and 2) on CRSM 112 (FIG. 1) and executed on one or more processors (not shown) of CPU 104 (FIG. 1) of computing system 102 (FIG. 1).

Process 200 starts in a "Begin CWSO Initialization" block 202 and proceeds immediately to an "Initialize Global Rank" block 204. During processing associated with block 204, parameters representing the ranking of each function and library (see FIGS. 3 and 4) is assigned, in the following examples, a value of '1'. During processing associated with an "Initialize Main Weight and Rank" block 206, weight and rank parameters associated with main (170, lines 1-17) are initialized, in the following examples, to a value of '1'. During processing associated with a "Generate WR Graph" block 208, a Weight and Ranking (WR) graph (see FIG. 8) corresponding to the source code 170 and library code 180 is generated (see 240, FIG. 6). During processing associated with a "Generate Object File" block 21, an object file, corresponding to application 122 (FIG. 1), is generated (see 270, FIG. 7) for source code 170 and library code 180 based upon the WR graph generated during processing associated with block 208. Finally control proceeds to an "End CWSO Initialization" block 219 during which process 200 is complete.

Figure 6:
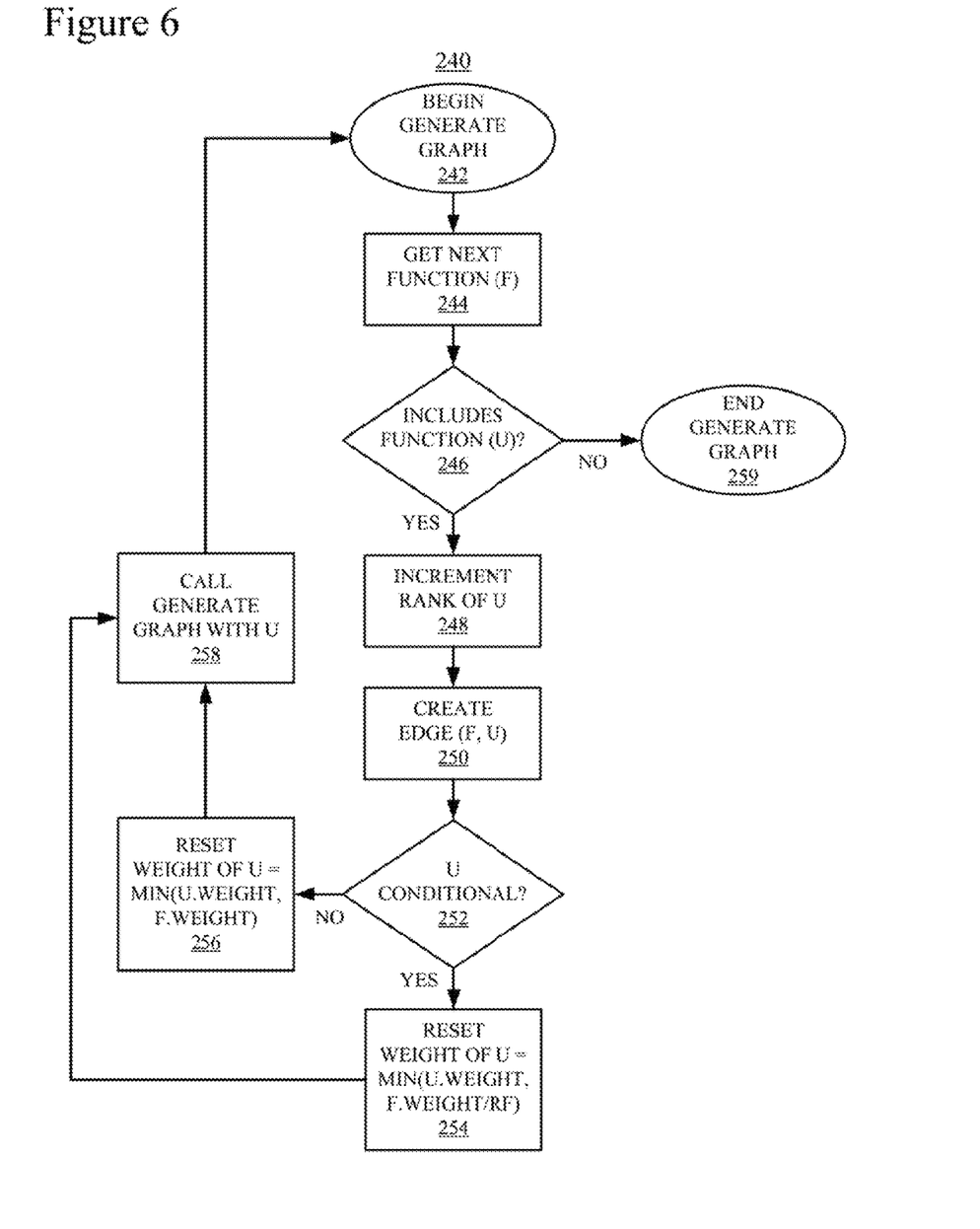
FIG. 6 is a flowchart of a Generate Graph process that may implement aspects of the claimed subject matter.

FIG. 6 is a flowchart of a Generate Graph process 240 that may implement aspects of the claimed subject matter. Like process 200, in this example, logic associated with process 240 is stored in conjunction with CWSO 118 (FIGS. 1 and 2) on CRSM 112 (FIG. 1) and executed on one or more processors (not shown) of CPU 104 (FIG. 1) of computing system 102 (FIG. 1). It should be noted that process 240 is recursive, i.e. Process 240 calls itself, thus creating multiple, concurrent iterations of process 240. Each time process 240 is called, an entry point, or entry point in either source code 170 (FIG. 3) or library code 180 (FIG. 4) is provided so that process 240 may start from that point in the original code 170 and 180. In this manner, the code 170 and 180 is traversed in a manner that will be familiar to one with skill in the relevant arts and all functions and library functions are eventually assigned a weight. It should also be noted that in the following description the terms "function F" and function "U" are relative or, in other words, F and U refer to functions within a particular iteration of process 240 and do not refer to the any specific function throughout all iterations.

Process 240 starts in a "Begin Generate Graph" block 242 and proceeds immediately to a "Get Next Function (F)" block 244. During processing associated with block 244, the first function (F) in the identified portion of code 170 and 180 is identified, i.e. F is the next function in whatever portion of code 170 or 180 with which process 240 is called. During processing associated with a "Includes Function U?" block 246, a determination is made as to whether or not function F, identified during processing associated with block 244, includes, or calls, another function U. If so, during processing associated with an "Increment Rank of U" block 248, a parameter that stores the ranking associated with function U is incremented.

Simply stated, each function and library is ranked according to the order in which the function or library function is called during execution. For example, main (170, lines 1-17) is assigned a value of '1', fun_1 (170, lines 19-22) is assigned a value of '2' and fun_2 (170, lines 24-28) is assigned rank of '3'. The next function that is called, from within fun_2 (170, lines 46-49), is lfun_3 (180, lines 11-15), which is assigned a rank of '4'. In a similar fashion, lfun_5 (180, lines 22-25), which is called from lfun_3 (180, lines 11-15) is assigned rank of '5' and fun_6 (170, lines 46-49) is assigned rank of '6', respectively.

As the ranking continues in accordance with the disclosed technology, lfun_1 (180, lines 1-4) is assigned a rank of '7', fun_3 (170, lines 30-33) is assigned a rank of '8', fun_4 (170, lines 35-39) is assigned a rank of '9', lfun_4 (180, lines 17-20) is assigned a rank of '10', fun_5 (170, lines 41-44) is assigned a rank of '11' and lfun_2 (180, lines 6-9).

Figure 8:
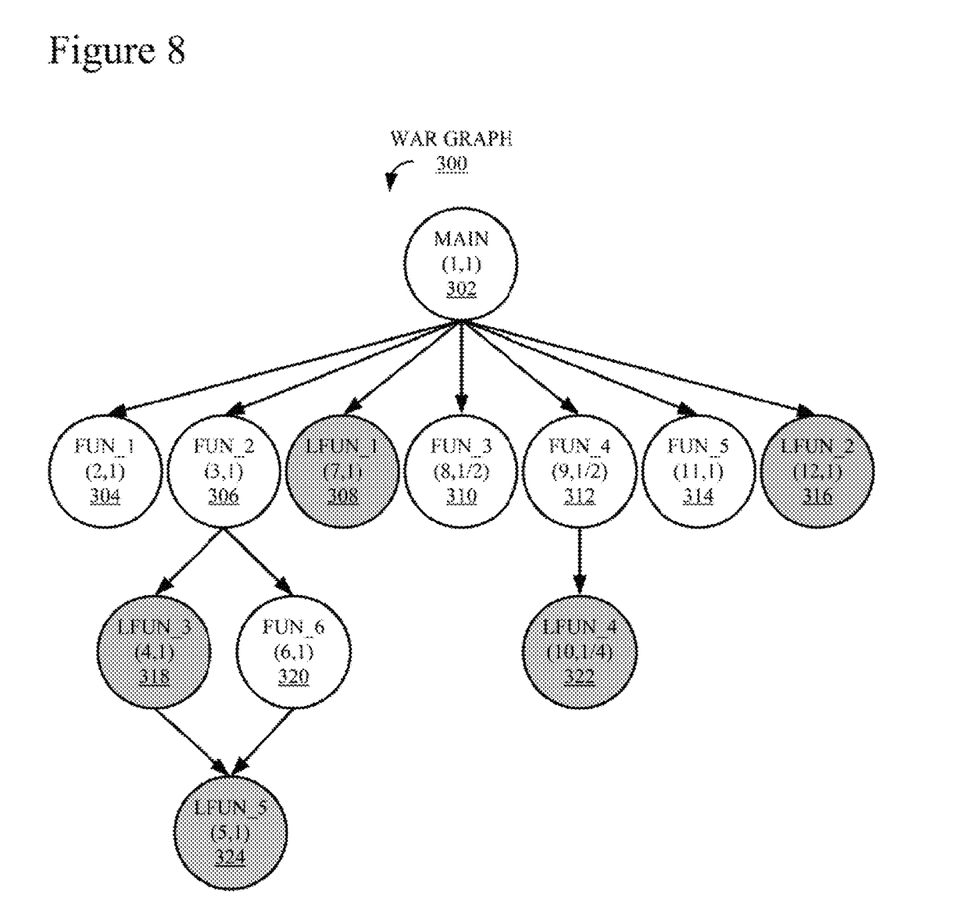
FIG. 8 is a block diagram of a Weight and Ranking (WR) graph generated in accordance with the claimed subject matter.

During processing associated with a "Create Edge F, U" block 250, an edge is created in the graph to show the connection between F and U (see FIG. 8, in which each arrow represents an edge). During processing associated with a "U Conditional?" block 252, a determination is made as to whether or not the function U is conditional i.e. the calling of function U depends upon the satisfaction of a defined condition (see 170, FIG. 3, lines 7, 14 and 37). If so, control proceeds to a "Reset Weight of U=MIN(U.Weight, F.Weight/RF)" block 254.

During processing associated with block 254 the weight associated with function U is reduced by a factor corresponding to an administrator defined options (see 150, FIG. 2) and the formula defined as the minimum, or lesser of, the current weight of U and the current weight of F divided by a reduction factor (RF). For example, if the weight reduction parameter is '2', the current weight of function U is '1', the current weigh of function F is '1', the reset weight of function U becomes '1/2', i.e. MIN(1, 1/(1/2)).

If during processing associated with block 252 a determination is made that U is not conditional, control proceeds to a "Reset Weight of U=MIN(U.Weight, F.Weight)" block 256. During processing associated with block 256, the parameter corresponding to the weight of the function U is set to a value equal to the lesser of the current weight value associated function F and the current weigh value of function U, i.e. Weight of U=MIN (Weight of F, Current Weight of U). If either of these values has not yet been set, a value of '1' is assumed.

Once the weight of U has been reset during processing associated with block 254 or 256, control proceeds to a "Call Generate Graph With U" block 258. During processing associated with block 258, process 240 is called again with function U as the starting point and processing continues as described above. In other words, function U becomes function F in a new iteration of process 240. Finally, it during processing associated with block 246, a determination is made that the current function F does not include any function U, control proceeds to an "End Generate Graph" block 259 during which this particular iteration of process 240 is complete. As explained above, process 240 is recursive so processing is not complete until all the potentially multiple instantiations of process 240 have completed.

Figure 7:
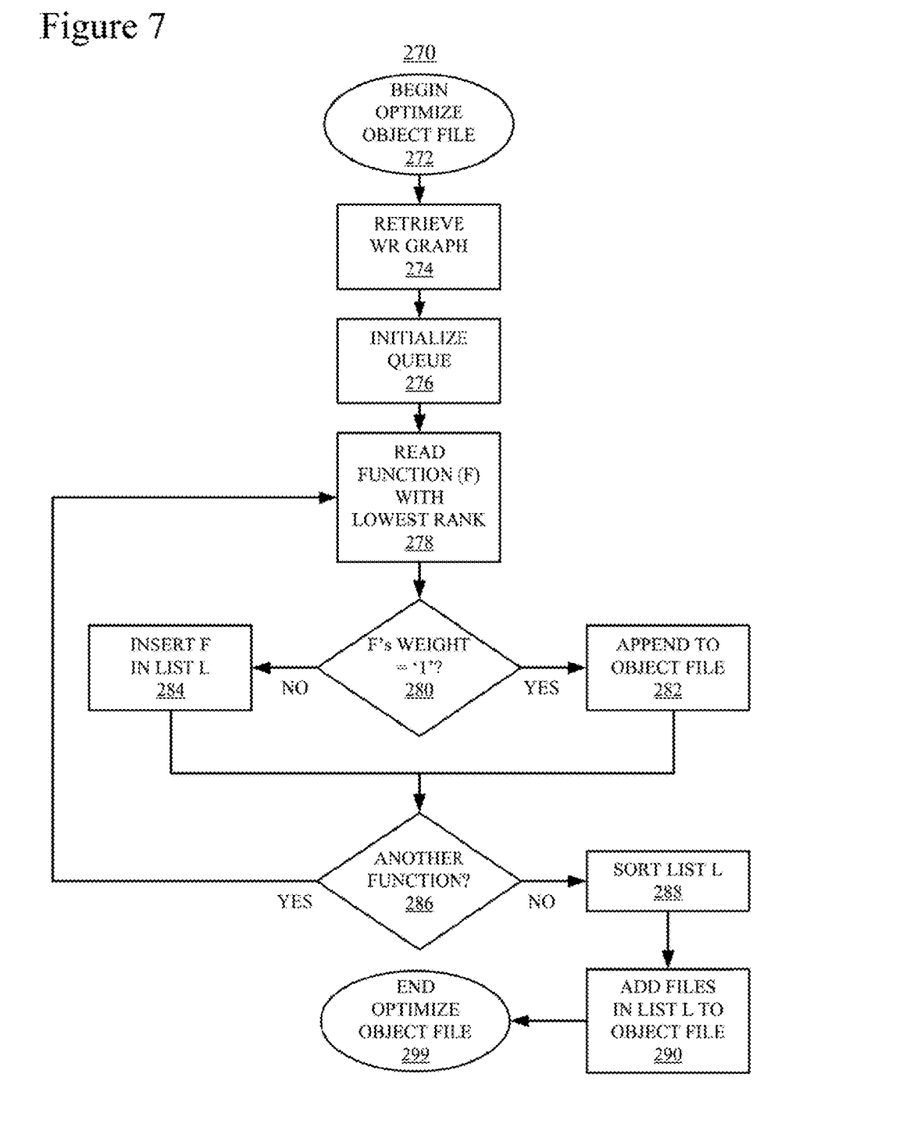
FIG. 7 is a flowchart of an Optimize Object File process that may implement aspects of the claimed subject matter.

FIG. 7 is a flowchart of an Optimize Object File process 270 that may implement aspects of the claimed subject matter. Like processes 200 and 240, in this example, logic associated with process 270 is stored in conjunction with CWSO 118 (FIGS. 1 and 2) on CRSM 112 (FIG. 1) and executed on one or more processors (not shown) of CPU 104 (FIG. 1) of computing system 102 (FIG. 1).

Process 270 starts in a "Begin Optimize Object File" block 272 and proceeds immediately to a "Retrieve WR Graph" block 274. During processing associated with block 274, the generated WR graph (see 240, FIG. 6) is retrieved from working data 152 (FIG. 2). In one embodiment, a WR graph or a pointer to a WR graph in working data 152 is passed to process 270 as an argument. During processing associated with an "Initialize Queue" block 276, an object file is started although at this point no functions have been added. In this example, the object file eventually becomes application 122 (FIG. 1). In addition a list L (not shown) is created in working data 152.

During processing associated with a "Read Function F With Lowest Rank" block 278, the WR graph retrieved during processing associated with block 274 is parsed to find the lowest ranking function. During processing associated with a "F's Weight '1'?" block 280, determination is made as to whether or not the function F found during processing associated with block 278 has a weight of '1'. If so, control proceeds to an "Append to Object File" block 282. During processing associated with block 282, the function read during processing associated with block 278 is appended to the object file that was created during processing associated with block 276.

If during processing associated with block 280, a determination is made that the function F found during processing associated with block 278 does not have a weight of '1', control proceeds to an "Insert F in List L" block 284. During processing associated with block 284, the function F found during processing associated with block 278 is inserted into list along with a reference to the functions corresponding rank and weight. In one embodiment, as pointer to the function and the corresponding rank and weight are simply added to the list L. During processing associated with an "Another Function?" block 286, a determination is made as to whether or not there remain any unprocessed functions in the WR graph retrieved during processing associated with block 274. If so, control returns to block 278, the next function is found and processing continues as described above.

If not, control proceeds to a "Sort List L" block 288. During processing associated with block 288, list L, which includes all the functions added during processing associated with block 284, is sorted, first based upon highest weight and then by highest rank. It should be understood that "highest weight" means the larger number, i.e. '1/2' is higher than '1/4' and "highest rank" means the lowest number, i.e. rank '2' is higher than rank '3'.

During processing associated with an "Add Files in List L to Object File" block 290, the functions in list L are appended to the object file generated during processing associated with block 276 in the order generated during processing associated with block 288. Finally, control proceeds to an "End Optimize Object File" block 299 during which process 270 is complete.

FIG. 8 is a block diagram of a Weight and Ranking (WR) graph generated in accordance with the claimed subject matter (see 240, FIG. 6) with respect to source code 170 (FIG. 3) and library code 180 (FIG. 4). A node 302 represents main (170, lines 1-17) and indicates that the weight and rank are both equal to 1, i.e. (1, 1). A node 304 represents fun_1 (170, lines 19-22) with a rank and a weight equal to '2' and respectively, i.e. (2, 1). A node 306 represents fun_2 (170, lines 24-28) with a rank and a weight equal to '3' and '1', respectively, i.e. (3, 1). A node 308 represents lfun_1 (180, lines 1-4) with a rank and a weight equal to '7' and '1', respectively, i.e. (7, 1). In FIG. 8, un-shaded nodes such as nodes 302, 304 and 306 represent functions from source code 170 and shaded nodes such as node 308 indicate that the node represents a library function from library code 180.

A node 310 represents fun_3 (170, lines 30-33) with a rank and a weight equal to '8' and '1/2', respectively, i.e. (8, 1/2). A node 312 represents fun_4 (170, lines 35-39) with a rank and a weight equal to '9' and '1/2', respectively, i.e. (9, 1/2).

A node 314 represents fun__5 (170, lines 41-44) with a rank and a weight equal to '11' and '1', respectively, i.e. (11, 1). A node 316 represents lfun__2 (180, lines 6-9) with a rank and a weight equal to '12' and '1', respectively, i.e. (12, 1). A node 318 represents lfun__1 (180, lines 11-15) with a rank and a weight equal to '4' and '1', respectively, i.e. (4, 1). A node 320 represents fun__6 (170, lines 46-49) with a rank and a weight equal to '6' and '1', respectively, i.e. (6, 1). A node 322 represents lfun__4 (180, lines 17-20) with a rank and a weight equal to '10' and '1/4', respectively, i.e. (10, 1/4). A node 324 represents lfun__5 (180, lines 22-25) with a rank and a weight equal to 5' and '1', respectively, i.e. (5, 1).

Each arrows between nodes such as the arrows between node 302 and 304, 306, 308, 310, 312, 314 and 316 represent "edges" (see 250, FIG. 6). It should be noted that WR graph 300, which is one representation of code 170 and 180, illustrates one example of a simple WR graph. Many application would correspond to WR graphs of greater complexity, i.e. with more nodes and edges.

Figure 9:
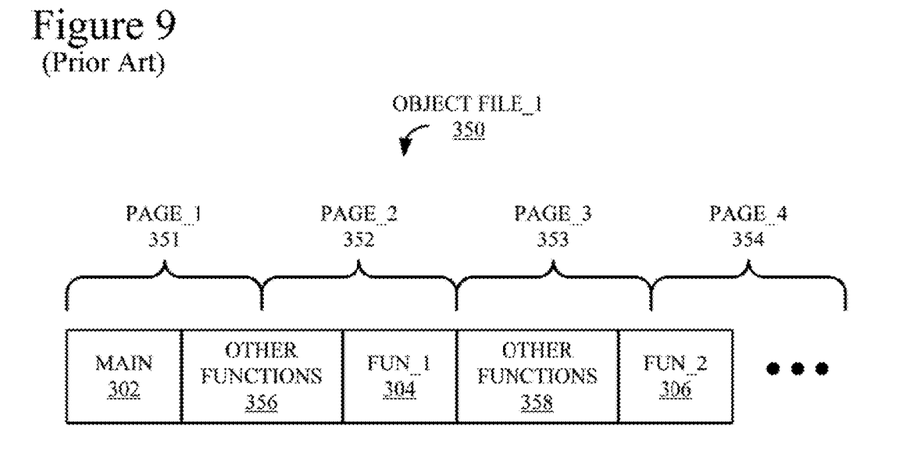
FIG. 9 is a conceptual view of an object file generated using typical compiling techniques.

FIG. 9 is a conceptual view of an object file__1 350 generated using typical compiling techniques. Object code 350 is divided into pages, i.e. a page__1 351, a page__2 352, a page__3 353 a page__4 354, and so on (not shown). As explained above a page represents a block of memory that is typically loaded and unloaded as a unit.

Object file__1 350 includes a compiled versions of main (170, lines 1-17. FIG. 3), represented here as node 302 of WR graph 300 (FIG. 8), a number of other functions 356, fun__1 (170, lines 19-22), represented as node 304 (FIG. 8), a second collection of functions 358, fun__2 (170, lines 24-28), represented as node 306 (FIG. 8) and so on (not shown). Typically, other functions 356 include any library function called by main 302 and other functions 358 includes any library functions called by fun__1 304. It should be noted that nodes 392, 304 and 306 are inserted into object file__1 359 in the order they appear in source code 170, with each followed by any library routines 180 that are called. This technique is designed to minimize page faults during run time rather than during startup time like the claimed subject matter.

FIG. 19 is a conceptual view of an object file__2 400 corresponding to the source code file listed in FIG. 3 generated in accordance with the claimed subject matter. Object code 400 is divided into pages, i.e. a page__1 401, a page__2 402, a page__3 3 403 a page__4 494, and so on (not shown). In this example, compiled versions of source code 170 are inserted into object file__2 400 in accordance with Optimize Object File process 270 (FIG. 7) based upon rankings and weights assigned during processing associated with Generate Graph process 240 (FIG. 6).

Figure 10:
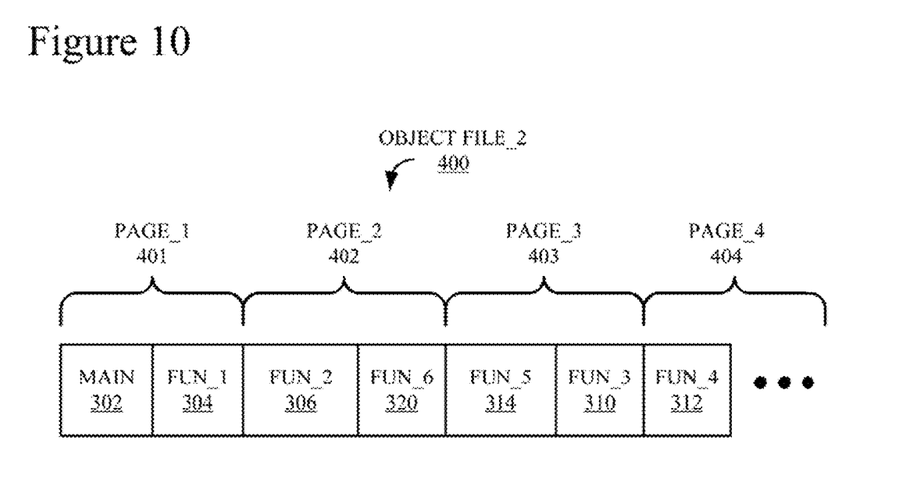
FIG. 10 is a conceptual view of an object file corresponding to the source code file listed in FIG. 3 generated in accordance with the claimed subject matter.

In this example, compiled versions of are inserted into object file__2 400 in the order main 302, fun__1 394, fun__2 306, fun__6 320, fun__5 314, fun__3 310, fun__4 312 and so on (not shown). This particular order is designed to minimize page faults during application startup time, i.e. when object file__2 400 is loaded from a CRSM such as CRSM 112 or a CRSM (not shown) coupled to server 130 (FIG. 1) onto a CPU such as CPU 104 (FIG. 1) of computing system__1 102 (FIG. 1) for execution.

Figure 11:
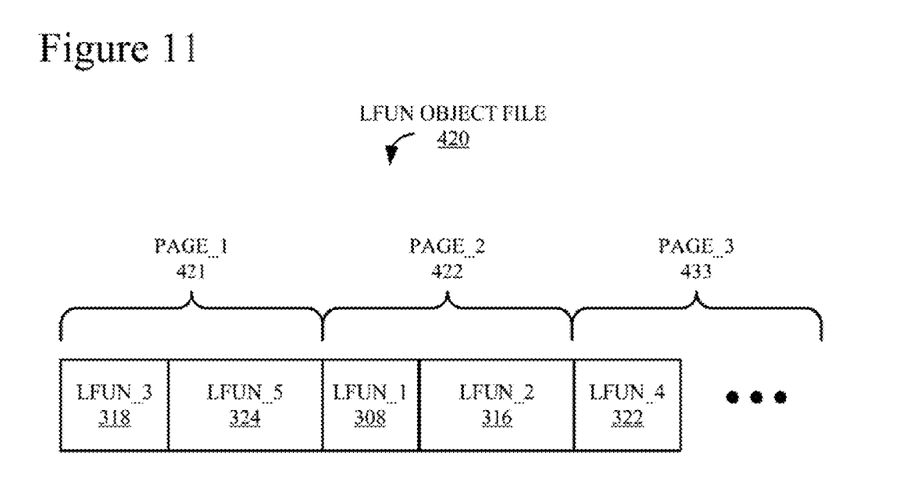
FIG. 11 is a conceptual view of an object file corresponding to the library code file listed in FIG. 4 generated in accordance with the claimed subject matter.

FIG. 11 is a conceptual view of an lfun object file 420 corresponding to library code 180 listed in FIG. 4 generated in accordance with the claimed subject matter. Object code 420 is divided into pages, i.e. a page__1 421, a page__2 422, a page__3 423 and so on (not shown). In this example, compiled versions of library code 180 are inserted into lfun object the 409 in accordance with Optimize Object File process 270 (FIG. 7) based upon rankings and weights assigned during processing associated with Generate Graph process 240 (FIG. 6). In this example, compiled versions of are inserted into object lfun file 420 in the order lfun__3 318, lfun__5 324, lfun__1 308, lfun__2 316, lfun__4 322 and so on (not shown). Like the order corresponding to source code 170 (FIG. 2) illustrated above in conjunction with FIG. 10, this particular order is also designed to minimize page faults during application startup time, i.e. when lfun object file 420 is loaded from a CRSM such as CRSM 112 or a CRSM (not shown) coupled to server 130 (FIG. 1) onto a CPU such as CPU 104 (FIG. 1) of computing system__1 102 (FIG. 1) for execution.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
   parsing, on a plurality of processors, a source code file into a plurality of functions;
   ranking, on the plurality of processors, each particular function of the plurality of functions based upon an order of occurrence of each particular function in the source code file;
   generating, on the plurality of processors, a weight score for each function of the plurality of functions, wherein the weight score of each particular function corresponds to whether or not the particular function is called conditionally; and generating, on the plurality of processors, an object code file such that the plurality of functions are ordered in the object code file based upon the corresponding rankings and weight scores such that page faults are minimized with respect to an executable file generated from the object code file.

2. The method of claim 1, wherein the plurality of functions are ordered in the object code file such that a startup time is minimized.

3. The method of claim 1, generating a weight score comprising adjusting a corresponding weight score for the particular function based upon a number of times the particular function is called conditionally.

4. The method of claim 3, generating the weight score of a first function comprising taking a minimum between a weight score corresponding to the first function and a weight score corresponding to a second function that calls the first function.

5. The method of claim 4, wherein, when the second function calls the first function conditionally, the weight score of the second function is divided by a reduction factor prior to taking the minimum.

6. An apparatus, comprising:
a processor;
a computer-readable storage medium coupled to the processor; and
logic, stored on the computer-readable medium and executed on the processor, for:
parsing a source code file into a plurality of functions;
ranking each particular function of the plurality of functions based upon an order of occurrence of each particular function in the source code file;
generating a weight score for each function of the plurality of functions, wherein the weight score of each particular function corresponds to whether or not the particular function is called conditionally; and
generating an object code file such that the plurality of functions are ordered in the object code file based upon the corresponding rankings and weight scores such that page faults are minimized with respect to an executable file generated from the object code file.

7. The apparatus of claim 6, wherein the plurality of functions are ordered in the object code the such that a startup time is minimized.

8. The apparatus of claim 6, the logic for generating a weight score comprising logic for adjusting a corresponding weight score for the particular function based upon a number of times the particular function is called conditionally.

9. The apparatus of claim 8, the logic for generating the weight: score of a first function comprising logic for taking a minimum between a weight score corresponding to the first function and a weight score corresponding to a second function that calls the first function.

10. The apparatus of claim 9, wherein, when the second function calls the first function conditionally, the weight score of the second function is divided by a reduction factor prior to taking the minimum.

11. A computer programming product, comprising:
a non-transitive computer-readable storage medium; and
logic, stored on the computer-readable storage medium for execution on a plurality of processors, for generating a computer application, comprising logic for:
parsing a source code file into a plurality of functions;
ranking each particular function of the plurality of functions based upon an order of occurrence of each particular function in the source code file;
generating a weight score for each function of the plurality of functions, wherein the weight score of each particular function corresponds to whether or not the particular function is called conditionally; and
generating an object code file, corresponding to the application, such that the plurality of functions are ordered in the object code file based upon the corresponding rankings and weight scores such that page faults are minimized with respect to an executable file generated from the object code file.

12. The computer programming product of claim 11, wherein the plurality of functions are ordered in the object code file such that a startup time is minimized.

13. The computer programming product of claim 11, the logic for generating a weight score comprising logic for adjusting a corresponding weight score for the particular function based upon a number of times the particular function is called conditionally.

14. The computer programming product of claim 13, the logic for generating the weight score of a first function comprising logic for taking a minimum between a weight score corresponding to the first function and a weight score corresponding to a second function that calls the last function.

15. The computer programming product of claim 14, wherein, when the second function calls the first function conditionally, the weight score of the second function is divided by a reduction factor prior to taking the minimum.

* * * * *